(12) United States Patent
Mu

(10) Patent No.: US 9,291,847 B2
(45) Date of Patent: Mar. 22, 2016

(54) PIXEL UNIT AND TFT-LCD WITH TOUCH FUNCTION

(71) Applicant: Beijing BOE Optoelectronics Technology Co., Ltd., Beijing (CN)

(72) Inventor: Suzhen Mu, Beijing (CN)

(73) Assignee: Beijing BOE Optoelectronics Technology Co., Ltd., Beijing (CN)

( * ) Notice: Subject to any disclaimer, the term of this patent is extended or adjusted under 35 U.S.C. 154(b) by 141 days.

(21) Appl. No.: 14/027,643

(22) Filed: Sep. 16, 2013

(65) Prior Publication Data

US 2014/0078418 A1    Mar. 20, 2014

(30) Foreign Application Priority Data

Sep. 17, 2012  (CN) .......................... 2012 1 0345866

(51) Int. Cl.
*G02F 1/1333*   (2006.01)
*G06F 3/044*    (2006.01)
*G06F 3/041*    (2006.01)

(52) U.S. Cl.
CPC ............ *G02F 1/13338* (2013.01); *G06F 3/044* (2013.01); *G06F 3/0412* (2013.01)

(58) Field of Classification Search
CPC .... G02F 1/13338; G06F 3/0412; G06F 3/044
See application file for complete search history.

(56) References Cited

U.S. PATENT DOCUMENTS

| | | | | |
|---|---|---|---|---|
| 2010/0060600 | A1* | 3/2010 | Wang et al. | 345/173 |
| 2010/0164884 | A1* | 7/2010 | Chiu et al. | 345/173 |
| 2010/0225608 | A1* | 9/2010 | Zhou et al. | 345/173 |
| 2011/0006832 | A1* | 1/2011 | Land et al. | 327/517 |

FOREIGN PATENT DOCUMENTS

| | | |
|---|---|---|
| CN | 101666931 A | 3/2010 |
| CN | 102183853 A | 9/2011 |

OTHER PUBLICATIONS

First Office Action issued by the Chinese Patent Office for Chinese Patent Application No. 201210345866.7 dated Jul. 25, 2014, 7pgs.
English translation of First Office Action issued by the Chinese Patent Office for Chinese Patent Application No. 201210345866.7 dated Jul. 25, 2014, 5pgs.

* cited by examiner

*Primary Examiner* — Dennis Y Kim

(57) ABSTRACT

Embodiments of the invention provide a pixel unit and a TFT-LCD with touch function. The pixel unit comprises a data line, a gate line and a pixel electrode formed on a base substrate. The pixel unit further comprises: a first touch layer connected to the data line and not connected to the pixel electrode; and a second touch layer connected to the gate line and not connected to the pixel electrode.

14 Claims, 2 Drawing Sheets

PIXEL UNIT AND TFT-LCD WITH TOUCH FUNCTION

CROSS REFERENCE TO RELATED APPLICATIONS

This application claims priority from Chinese National Application No. 201210345866.7 filed on Sep. 17, 2012, the contents of which are incorporated herein by reference.

TECHNICAL FIELD

Embodiments of the invention relate to a pixel unit and a thin film transistor-liquid crystal display with touch function.

BACKGROUND

Thin Film Transistor-Liquid Crystal Display (hereinafter referred to as TFT-LCD) is widely applied in televisions, mobile phones, monitors and other electronic products due to its advantages of light weight, small thickness, easy to operation and low power consumption, and recently, the demands for the TFT-LCD with touch function are increased greatly.

Generally, the TFT-LCD with touch function is formed by individually designing and fabricating a LCD panel and a touch panel and then bonding the LCD panel and the touch panel together in a on-cell manner or a in-cell manner.

Since the LCD panel and the touch panel are bonded together in the on-cell manner or the in-cell manner, the resultant TFT-LCD with touch function is relatively thick. In addition, the fabrication process of the TFT-LCD with touch function is relatively complicated since the LCD panel and the touch panel are individually designed and fabricated.

SUMMARY

According to one aspect of the invention, there is provided a pixel unit. The pixel unit comprises a data line, a gate line and a pixel electrode formed on a base substrate. The pixel unit further comprises: a first touch layer connected to the data line and not connected to the pixel electrode; and a second touch layer connected to the gate line and not connected to the pixel electrode.

According to another aspect of the invention, there is provided a TFT-LCD with touch function. The TFT-LCD with touch function comprises: an array composed of a plurality of pixel units as described above; and a timing control unit, connected to the gate line and the data line to scan the pixel electrode through a timing control manner to perform an image display, and to scan the first touch layer and the second touch layer through the timing control manner to determine a touch position.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 1:
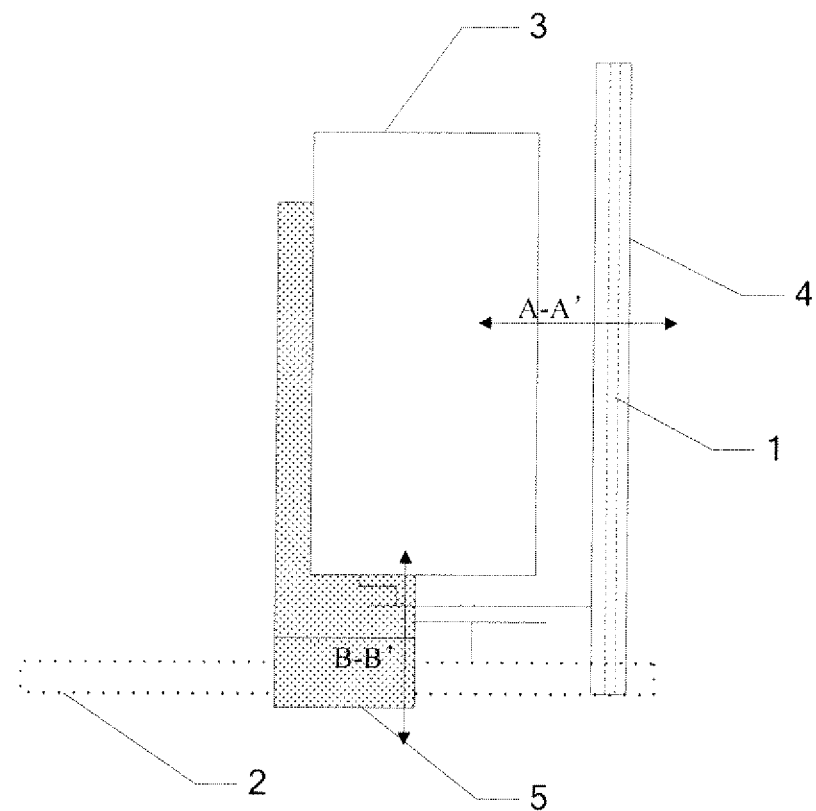
FIG. 1 is a plan view illustrating a pixel unit according to a first embodiment of the invention.
Figure 2:
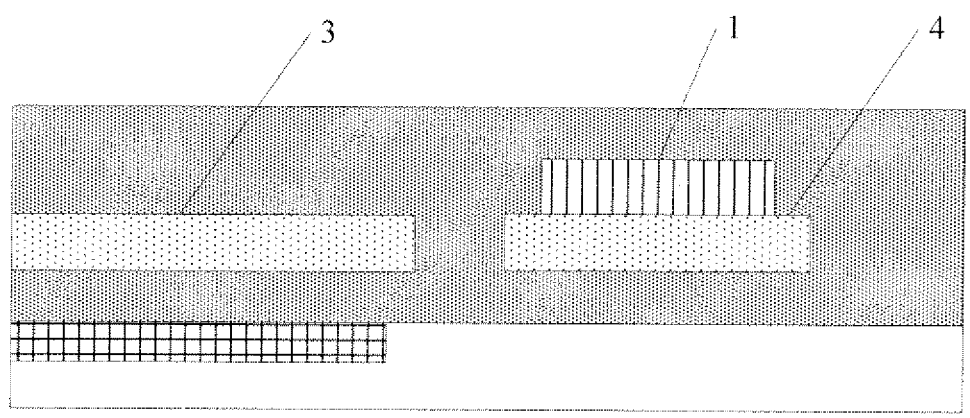
FIG. 2 is a cross-sectional view illustrating the pixel unit according to the first embodiment of the invention.
Figure 3:
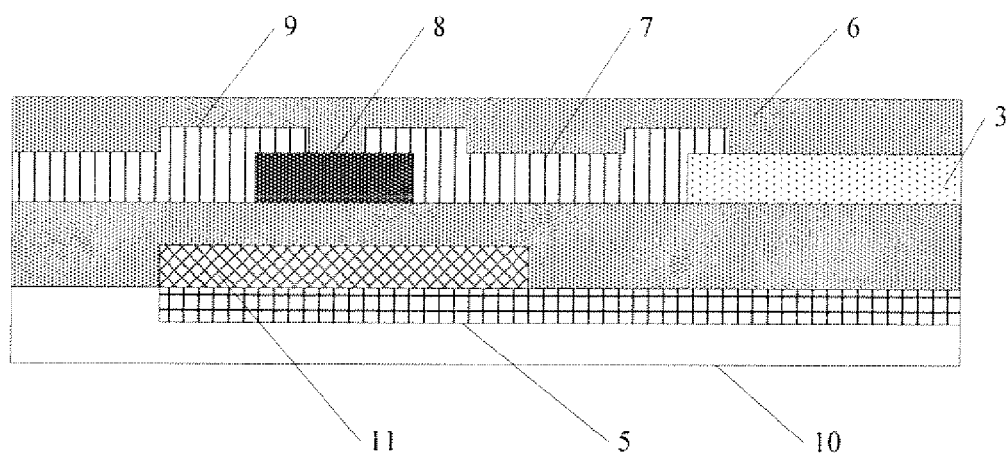
FIG. 3 is another cross-sectional view illustrating the pixel unit according to the first embodiment of the invention.

FIG. 1 is a plan view illustrating a pixel unit according to a first embodiment of the invention, FIG. 2 is a cross-sectional view taken along A-A' of FIG. 1, and FIG. 3 is a cross-sectional view taken along B-B' of FIG. 1. As shown in FIGS. 1-3, the pixel unit comprises: a data line 1, a gate line 2, a pixel electrode 3, a first touch layer 4 and a second touch layer 5.

The first touch layer 4 and the second touch layer 5 are arranged in parallel with a plane where the pixel electrode 3 is disposed. In order not to affect the image display, the first touch layer 4 and the second touch layer 5 are made of transparent material, such as indium tin oxide (ITO).

An overlapping portion of the gate line and the data line forms a touch capacitance.

The first touch layer 4 is connected to the data line 1 to form a touch surface of the touch capacitance, and the first touch layer 4 is not electrically connected to the pixel electrode 3.

The second touch layer 5 is connected to the gate line 2 to form the other touch surface of the touch capacitance, and the second touch layer 5 is not electrically connected to the pixel electrode 3.

The second touch layer 5 and the first touch layer 4 may be disposed in a same layer or in different layers, as long as the first touch layer 4 is connected to the data line 1 and the second touch layer 5 is connected to the gate line 2.

In the pixel unit according to the first embodiment of the invention, the overlapping portion of the gate line and the data line forms the touch capacitance, the first touch layer is connected to the data line to form the first touch surface, and the second touch layer is connected to the gate line to form the second touch surface. In this way, the touch function and the display function can share the date line and gate line, and the LCD panel can simultaneously have the display function and the touch function. Thereby, the fabrication process of the TFT-LCD with touch function can be simplified, and the weight and thickness of the TFT-LCD with touch function can be decreased.

For example, the data line 1, the gate line 2, the pixel electrode 3, the first touch layer 4 and the second touch layer 5 are formed on a same base substrate.

For example, the first touch layer 4 is formed in a regular pattern through a patterning process and is connected to the data line 1. Similarly, the second touch layer 5 is formed in a regular pattern through a patterning process and is connected to the gate line 2.

For example, when the first touch layer 4 is connected to the data line 1, they are connected directly, that is, there is not an insulating layer between them. When they are connected directly, it is unnecessary to form a via-hole for connection, thereby the fabrication process can be further simplified and the weight and thickness of the resultant product can be further reduced.

For example, the first touch layer 4 is disposed in the same layer as the pixel electrode 3, and is made of the same material as the pixel electrode 3. In this way, the first touch layer 4 and the pixel electrode 3 can be formed at the same time. As shown in FIG. 2, the data line 1 directly contacts the first touch layer 4, and the first touch layer 4 and the pixel electrode 3 are disposed in the same layer and are made of the same material. As a result, the number of the masks employed in the fabrication process can be reduced.

For example, the first touch layer 4 has a long strip shape in the extending direction of the data line 1, the projection of the first touch layer 4 on the base substrate and the projection of the data line 1 on the base substrate have an overlapping region, and a width of the projection of the first touch layer 4 is greater than a width of the projection of the data line 1.

For example, the second touch layer 5 is connected to the gate line 2 directly, that is, there is not an insulating layer between them. When a voltage signal is input, the second touch layer 5 and the gate line 2 have a same electric potential.

For example, the second touch layer 5 is directly formed on the base substrate (for example, the base substrate is made of glass), and then the gate line 2 is formed such that it is directly connected to the second touch layer 5. The second touch layer 5 is disposed in a different layer from the gate line 2 and is disposed below the gate line 2. Thereby, the fabrication process can be further simplified.

In FIG. 3, the reference number 6 denotes an insulating layer covering a TFT and the pixel electrode 3, 7 denotes a drain electrode of the TFT, 8 denotes an active layer of the TFT, 9 denotes a source electrode of the TR and 10 denotes the base substrate. As shown in FIG. 3, the second touch layer 5 is directly connected to the gate line 2, and there is not an insulating layer between them. In this way, the fabrication process can be simplified, and the weight and thickness of the resultant product can be reduced.

For example, in order to make the fabrication process of the second touch layer 5 more simpler, and determine the touch position more accurately, the second touch layer 5 is designed in such a way that the second touch layer 5 comprises a first sub-region and a second sub-region, wherein the first sub-region is connected to the gate line 2, the second sub-region is disposed below the pixel electrode 3, and the first sub-region and the second sub-region do not have an overlapping region.

In order to simplify the fabrication process, the above first sub-region is designed to have a long strip shape in the extending direction of the gate line 2, the projection of the first sub-region on the base substrate and the projection of the gate line 2 on the base substrate have an overlapping region, and a width of the projection of the first sub-region is greater than a width of the projection of the gate line 2.

It should be noted that although the above embodiment has described that the first touch layer 4 is directly connected to the data line 1 and the second touch layer 5 is directly connected to the gate line 2, it is not limited thereto. For example, an insulating layer may be arranged between the first touch layer 4 and the data line 1, and the first touch layer 4 may be connected to the data line 1 through a via-hole in the insulating layer. For example, an insulating layer may be arranged between the second touch layer 5 and the gate line 2, and the second touch layer 5 may be connected to the gate line 2 through a via-hole in the insulating layer.

It should be noted that although the above embodiment has described that the first touch layer 4 and the pixel electrode 3 are disposed in the same layer, it is not limited thereto. For example, the first touch layer 4 and the pixel unit 3 may be disposed in different layers, as long as the first touch layer 4 is connected to the data line 1.

It should be noted that although the above embodiment has described that the second touch layer 5 comprises a first sub-region and a second sub-region, it is not limited thereto. The second touch layer 5 may be designed in any other way, as long as the second touch layer 5 is connected to the gate line 2.

It should be noted that although the above embodiment has described that the first touch layer 4 and the second touch layer 5 are formed on the base substrate having the data line 1, the gate line 2 and the pixel electrode 3, it is not limited thereto. One or both of the first touch layer 4 and the second touch layer 5 may be formed on a substrate opposing to the base substrate having the data line 1, the gate line 2 and the pixel electrode 3, as long as the first touch layer 4 is connected to the data line 1 and the second touch layer 5 is connected to the gate line 2.

Figure 4:
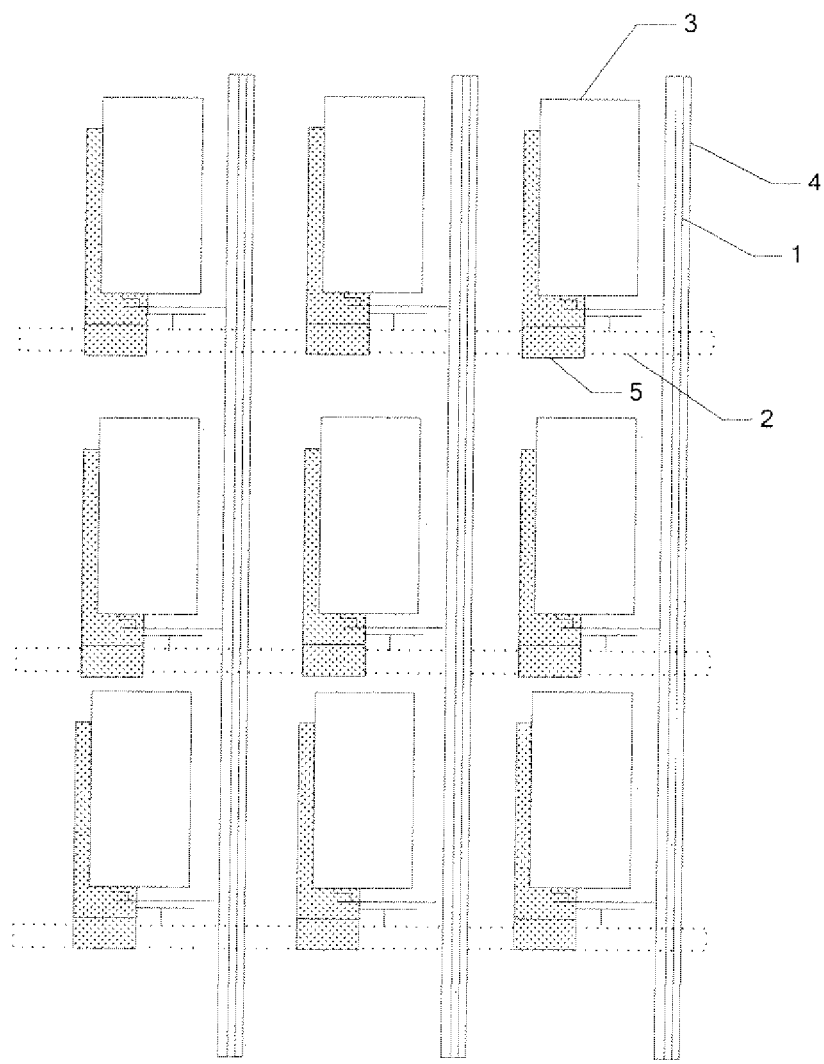
FIG. 4 is a schematic view illustrating a pixel unit array of a TFT-LCD according to a second embodiment of the invention.

A second embodiment of the invention provides a TFT-LCD with touch function. The TFT-LCD with touch function comprises an array composed of a plurality of pixel units, as shown in FIG. 4. Each of the pixel units is the pixel unit according to the first embodiment.

In order to achieve the touch function without affecting the image display function in the TFT-LCD, the TFT-LCD with touch function according to the second embodiment of the invention further comprises a timing control unit. The timing control unit is connected to the gate line and the data line to scan the pixel electrode through a timing control manner to perform an image display, and to scan the first touch layer and the second touch layer through the timing control manner to determine the touch position.

In the TFT-LCD with touch function according to the embodiment of the invention, the overlapping portion of the gate line and the data line forms the touch capacitance, the first touch layer is connected to the data line to form the first touch surface, and the second touch layer is connected to the gate line to form the second touch surface. In this way, the touch function and the display function can share the date line and gate line, and the LCD panel can simultaneously have the display function and the touch function. Thereby, the fabrication process of the TFT-LCD with touch function can be simplified, and the weight and thickness of the TFT-LCD with touch function can be decreased.

The foregoing are only preferable embodiments of the invention. It is to be noted that, those with ordinary skills in the art may make various modifications and changes without departing the technical principle of the invention, and these modifications and changes should be deemed to be within the protection scope of the invention.

What is claimed is:

1. A pixel unit, comprising a data line, a gate line and a pixel electrode formed on a base substrate, wherein the pixel unit further comprises:
   a first touch layer connected to the data line and not connected to the pixel electrode; and
   a second touch layer connected to the gate line and not connected to the pixel electrode,
   wherein an overlapping portion of the gate line and the data line forms a touch capacitance,
   the pixel electrode is arranged entirely in a region defined by the intersecting of the data line and the gate line,
   the second touch layer and the gate line are disposed in different layers, and a portion of the second touch layer extends below the pixel electrode and overlaps with the pixel electrode in a direction vertical to a surface of the pixel electrode.

2. The pixel unit according to claim 1, wherein the first touch layer and the second touch layer are arranged in parallel with a plane where the pixel electrode is disposed, and are made of a transparent material.

3. The pixel unit according to claim 2, wherein the transparent material is ITO.

4. The pixel unit according to claim 1, wherein the second touch layer and the first touch layer are disposed in different layers.

5. The pixel unit according to claim 1, wherein the second touch layer and the first touch layer are disposed in a same layer.

6. The pixel unit according to claim 1, wherein the first touch layer and the second touch layer have regular patterns.

7. The pixel unit according to claim 1, wherein the first touch layer is directly connected to the data line without an insulating layer provided therebetween.

8. The pixel unit according to claim 1, wherein the first touch layer and the pixel electrode are disposed in a same layer.

9. The pixel unit according to claim 8, wherein the first touch layer has a long strip shape in an extending direction of the data line, a projection of the first touch layer on the base substrate and a projection of the data line on the base substrate have an overlapping region, and a width of the projection of the first touch layer is greater than a width of the projection of the data line.

10. The pixel unit according to claim 1, wherein the second touch layer is directly connected to the gate line without an insulating layer provided therebetween.

11. The pixel unit according to claim 10, wherein the second touch layer is disposed below the gate line.

12. The pixel unit according to claim 11, wherein the second touch layer comprises a first sub-region and a second sub-region, wherein the first sub-region is connected to the gate line, the second sub-region is disposed below the pixel electrode, and the first sub-region and the second sub-region do not have an overlapping region.

13. The pixel unit according to claim 12, wherein the first sub-region has a long strip shape in an extending direction of the gate line, a projection of the first sub-region on the base substrate and a projection of the gate line on the base substrate have an overlapping region, and a width of the projection of the first sub-region is greater than a width of the projection of the gate line.

14. A TFT-LCD with touch function, comprising:
an array composed of a plurality of pixel units according to claim 1; and
a timing control unit, connected to the gate line and the data line to scan the pixel electrode through a timing control manner to perform an image display, and to scan the first touch layer and the second touch layer through the timing control manner to determine a touch position.

* * * * *